April 6, 1954
E. LANDENBERGER ET AL
2,674,416
TELESCOPIC AERIAL FOR VEHICLES, IN
PARTICULAR FOR MOTORCARS
Filed March 27, 1951
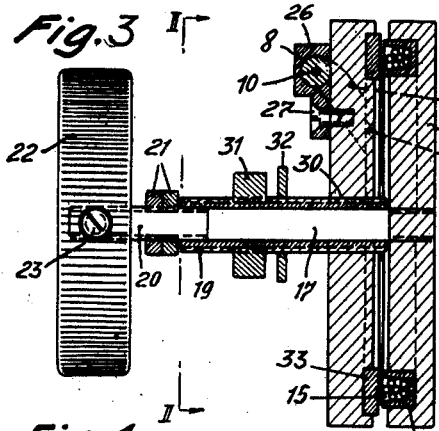
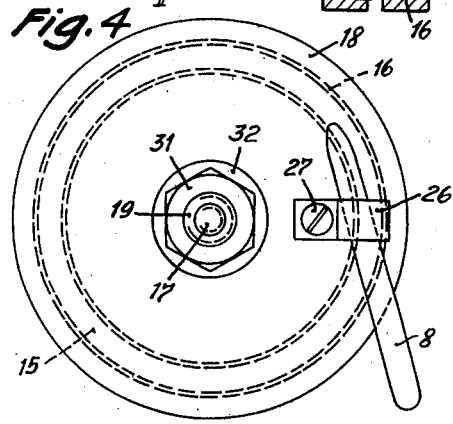
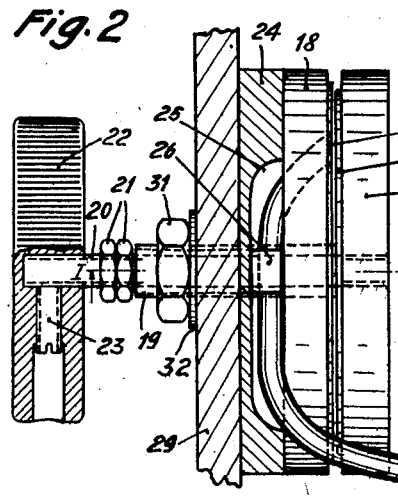
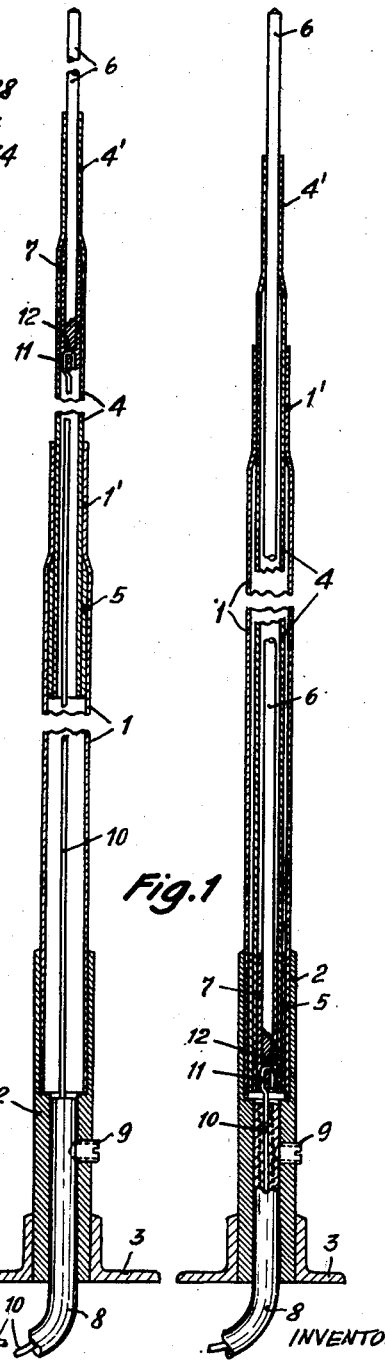
INVENTORS:
E. Landenberger
O. Eberle
By Bryant + Lowry
ATTYS.

UNITED STATES PATENT OFFICE 2,674,416

TELESCOPIC AERIAL FOR VEHICLES, IN PARTICULAR FOR MOTORCARS

Eugen Landenberger, Saint Gallen, Switzerland, and Othmar Eberle, Triesen, Liechtenstein Application March 27, 1951, Serial No. 217,705

4 Claims. (Cl. 242—54)

Telescopic aerial rods, in particular for motor cars, are usually pushed together again when the vehicle is not in use, or when the driver leaves the vehicle, e. g. when the vehicle is parked, in order to reduce the danger of damaging the aerial, and also to protect it against the weather.

In most cases it is not possible to operate the aerial when the vehicle is in motion, or at least it is unpleasant work in bad weather.

The present invention concerns a telescopic aerial rod for vehicles, in particular for motor cars. According to this invention, one of the moving parts of the rod is connected mechanically to an operating device which is located at some distance away from the aerial, so that the sections of the rod can be pushed in or pulled out by remote control. It is convenient to connect the inner section of the pushed-in rod to one end of the internal wire of a Bowden cable, the other end of the cable wire being connected to a spool which is a part of the operating device, and the spool is fixed so that it can be reached from the driver's seat in the vehicle.

The operating device could be hand-operated or driven by an electric motor.

The drawing shows a possible construction of the object of this invention.

Fig. 1 is a longitudinal section of the telescopic aerial rod,

Fig. 2 shows the telescopic aerial rod in section and the operating device therefor partly in elevation and partly in section, Fig. 3 is a view of the operating device, partly in section, Fig. 4 is a side elevational view of the operating device for the telescopic aerial rod with the thumb wheel removed.

The telescopic aerial rod shown in the drawing has an external tube 1, its top end 1' is of smaller diameter than the remainder of the tube, and its lower end is provided with a reinforcing cap 2 and a flanged foot 3 to fix the aerial to the vehicle. In side tube 1 slides a narrower tube 4 which at its upper portion 4' again is reduced in diameter and has at its lower end a reinforcement piece 5. Tube 4 is guided in tube 1 by the reduced portion 1' and by the reinforcing piece 5. The reduced portion 1' also prevents water from getting into the aerial. Tube 4 can be pulled out until reinforcement 5 knocks against the reduced portion 1'. A rod 6 slides in tube 4 and carries at its lower end a reinforcement 7. Rod 6 is guided by reinforcement 7 and by the reduced portion 4', where the reduced portion 4' prevents the entry of water into the tubes, because it makes a tight sliding fit with rod 6. At the lower end of the reinforcing cap 2 of the tube 1—the internal diameter of the reinforcing cap 2 is here reduced—one end of the Bowden cable 8 is fixed by means of a set screw 9. The corresponding end of the Bowden cable wire 10 is fixed to the lower end of rod 6 by hooking the hook-shaped end 11 of the wire 10 into an eyelet 12 at the lower end of rod 6. The other end of the wire of the Bowden cable 8 leads to a spool 13 and is fixed to an inset ring 16 with a groove 15. Groove 15 is a coiling groove. The spool has a fixed central shaft 17 which enables it to be rotated inside bearing tube 19, which is fixed to a guide plate 18. Shaft 17 is surrounded by the bearing tube, and the end projecting from the tube is threaded. Two nuts 21 screwed on the shaft at this end ensure the correct distance of spool 13 from the guide plate 18. 22 is a thumb wheel screwed on the threaded portion 20 and fixed by a set screw 23; which serves to rotate spool 13. 24 is a gripping plate, next to the guide plate 18, it has a recess 25 to admit the Bowden cable 8 and cable clip 26. Cable clip 26 is fixed by means of a screw 27 to the guide plate 18 and is used to fix the end of Bowden cable 8 which is taken through an oblique drilled hole 28 in guide plate 18. The operating device is mounted to the dash board of the vehicle. The gripping plate 24 rests against the back of the dash board 29. The bearing tube 19 projects through the dash board 29 with the drilled hole 30, so that the dash board is firmly gripped between the nut 31, with a washer 32, and the guide plate 18, with the gripping plate 24, at the back of the dash board. On that face of guide plate 18 which is adjacent to spool 13 a guide ring 33 is fixed in a suitable groove and covers the coiling groove 15 of spool 13, so that the coils of the Bowden cable wire cannot fall out, see Fig. 3. Ring 33 has a drilled hole 34 concentric with the oblique drilled hole 28, this hole 28 guides cable wire 10 to the coiling groove 15 of the spool.

By rotating thumb wheel 22 in one direction, the wire is coiled off and the aerial is pushed out. By turning it in the opposite direction, the aerial is pulled in again.

Instead of using a thumb wheel, the operating device can be driven by an electric motor, which is switched on or off by means of a switch, and drives the spool shaft through worm gearing, and which is switched off automatically when the aerial is pushed out or pulled in.

While the invention has been described in detail with respect to a now preferred example and embodiment of the invention, it will be understood by those skilled in the art after understanding the invention, that various changes and modifications may be made without departing from the spirit and scope of the invention and it is intended, therefore, to cover all such changes and modifications in the appended claims.

Having thus described our invention, we claim as new and desire to secure by Letters Patent:

1. In a reel for anchoring one end of a Bowden cable and for winding thereon the wire of the Bowden cable used for extension and retraction of a telescopic aerial, said reel comprising a stationary guide plate and a rotatable spool arranged face to face and in spaced relation, an operating shaft axially journaled in the guide plate and fixed to the spool, a sleeve surrounding the shaft extending into the guide plate and acting to space the guide plate and spool from each other, a wire-receiving circular groove in the face of the spool facing the guide plate, a Bowden cable having one end anchored to the outer face of the guide plate and the wire of the Bowden cable passing transversely through the guide plate for winding reception in the groove of the rotatable spool and a relatively deep circular channel member in said groove for the reception of said wire.

2. A reel as in claim 1, wherein a guide ring is fixed to the guide plate and overlies the wire-receiving groove in the spool to retain the wound wire in the groove and said ring having an opening therein for the passage of said wire.

3. In a reel for anchoring one end of a Bowden cable and for winding thereon the wire of the Bowden cable used for extension and retraction of a telescopic aerial, said reel comprising a stationary guide plate and a rotatable spool arranged face to face and in spaced relation, an operating shaft axially journaled in the guide plate and fixed to the spool, a sleeve surrounding the shaft extending into the guide plate and acting to space the guide plate and spool from each other, a wire-receiving circular groove in the face of the spool facing the guide plate, a Bowden cable having one end anchored to the outer face of the guide plate and the wire of the Bowden cable passing transversely through the guide plate for winding reception in the groove of the rotatable spool, the stationary guide plate having a slot extending therethrough for the passage of the wire into the groove in the spool and a relatively deep circular channel member in said groove for the reception of said wire.

4. A reel as in claim 1, wherein a guide ring is fixed to the guide plate and overlies the wire-receiving groove in the spool to retain the wound wire in the groove, and said ring having an opening therein for the passage of said wire the stationary guide plate having a diagonal slot extending therethrough for the passage of the wire into the groove in the spool.

References Cited in the file of this patent

UNITED STATES PATENTS

| Number | Name | Date |
|---|---|---|
| 2,071,383 | Barrett | Feb. 23, 1937 |
| 2,274,882 | Brach | Mar. 3, 1942 |
| 2,344,490 | Brach | Mar. 21, 1944 |
| 2,350,866 | Barth | June 6, 1944 |
| 2,435,086 | Lack | Jan. 27, 1948 |
| 2,623,175 | Finke | Dec. 23, 1952 |